Sept. 25, 1928.

W. LA HODNY

MIRROR BRACKET

Filed April 15, 1924   2 Sheets-Sheet 1

1,685,544

Inventor:
William La Hodny
by Poff & Powers
Attys.

Sept. 25, 1928.  
W. LA HODNY  
MIRROR BRACKET  
Filed April 15, 1924
1,685,544
2 Sheets-Sheet 2
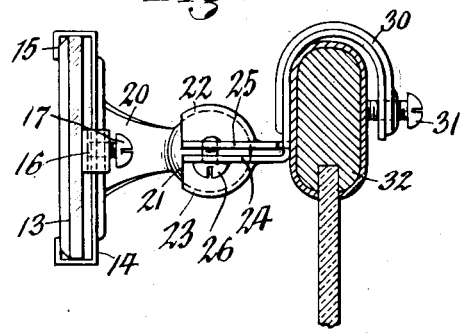
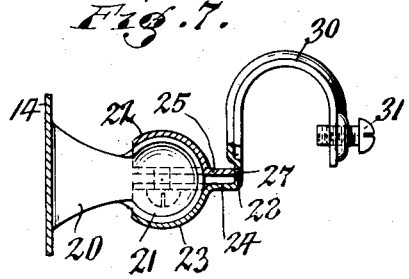
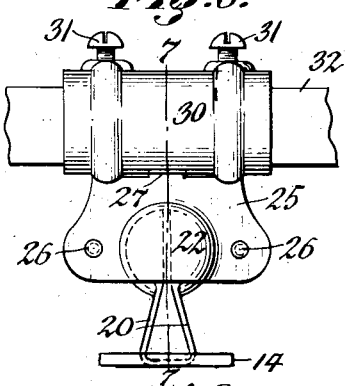
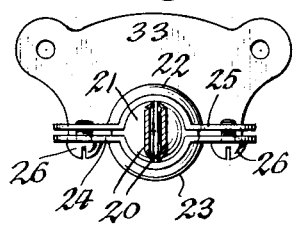
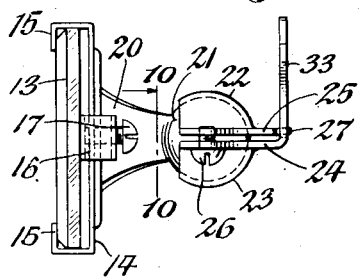
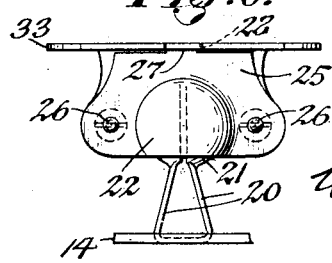

Patented Sept. 25, 1928.

1,685,544

UNITED STATES PATENT OFFICE.

WILLIAM LA HODNY, OF BUFFALO, NEW YORK, ASSIGNOR TO STANDARD MIRROR CO. INC., OF BUFFALO, NEW YORK, A CORPORATION OF NEW YORK.

MIRROR BRACKET.

Application filed April 15, 1924. Serial No. 706,693.

This invention relates to a bracket for supporting a rear view mirror on an automobile and has for its object the provision of such a bracket having improved means for permitting the mirror to be adjusted to suit different conditions and also to permit of mounting the mirror so that it does not unduly obstruct the room in front of the driver and still enable the windshield to be freely adjusted for opening and closing the same.

Figure 1:
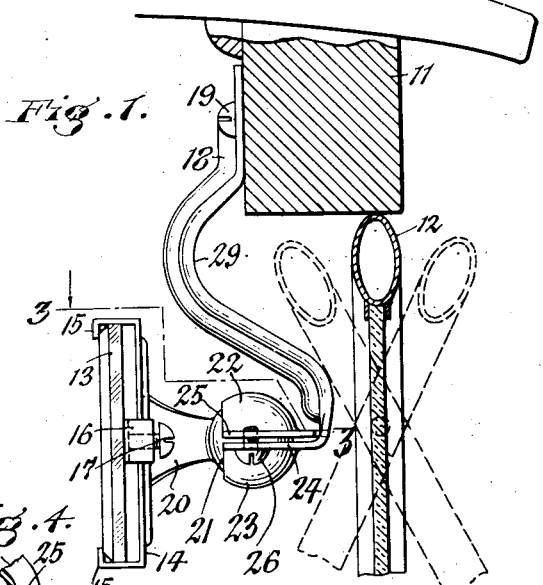
Figure 4:
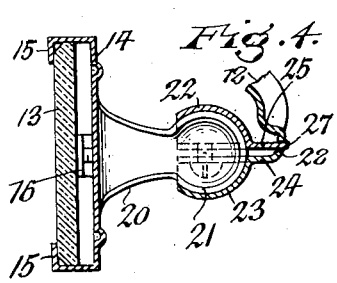
Figure 2:
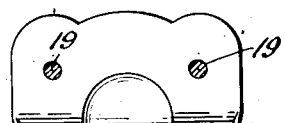
Figure 2:
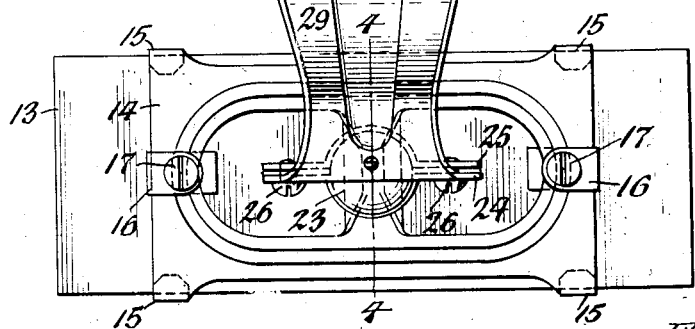
Figure 3:
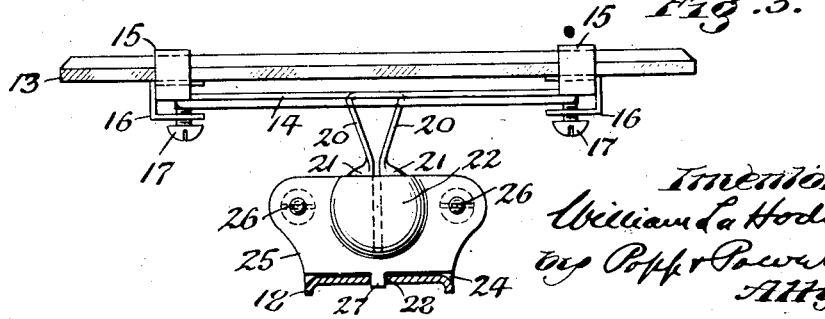

In the accompanying drawings: Figure 1 is a side elevation of one form of my improved bracket showing the same employed for mounting a mirror on the front cross bar of an automobile canopy and adjacent to the inner side of the windshield. Figure 2 is a rear elevation of the same. Figure 3 is a horizontal section taken on line 3—3, Fig. 1. Figure 4 is a fragmentary vertical section taken on line 4—4, Fig. 2. Figure 5 is a modified form of my invention designed for attachment to the upper edge of a windshield. Figure 6 is a fragmentary top plan view thereof. Figure 7 is a fragmentary vertical longitudinal section of the same taken on the correspondingly numbered line in Figure 6. Figure 8 is a side elevation of another modification of my invention. Figure 9 is a fragmentary top plan view of the same. Figure 10 is a vertical cross section on line 10—10, Fig. 8.

Similar characters of reference indicate like parts throughout the several views.

In Figure 1 are shown parts of an automobile which are associated with one form of my invention and which comprise the upper front cross bar 11 of the canopy, and frame 12 of the upper section of the windshield which is arranged close to the bar 11 and capable of swinging about a horizontal axis so that its upper edge moves forward and backwardly adjacent to the underside of said canopy bar.

The mirror 13 may be of any suitable form, for instance, the same may be flat and of the rectangular shape shown in Figures 1-4. The bracket comprises essentially a head adapted to be attached to the mirror, a base adapted to be attached to a support and means for adjustably connecting the head and base. The head has a body 14 constructed in the form of a metal plate arranged in rear of the mirror and provided at its edges with hooks 15 which overhang the opposite edges of the mirror and clamping devices which hold the mirror in place and each of which comprises a U-shaped clip 16 embracing an edge portion of the body plate and a clamping screw 17 working in a threaded opening in the body plate and bearing with its front end against the front leg of the clip and pressing the same against the rear side of the mirror while the rear part of this screw passes through a guide opening in the rear leg of the clip.

The base comprises a hanger or upright bar 18 which is secured to the inner side of the canopy bar 11 by screws 19, or otherwise, while the lower end thereof is adjustably connected with the rear side of the body plate which carries the mirror. This adjustable connection in its preferred form is constructed as follows:

20, 20 represents two arms stamped out of the material of the body plate and bent rearwardly and having their rear ends constructed in the form of hemispheres 21, 21, which together form a ball. This ball is received between the upper and lower half sockets 22, 23 which together form a complete spherical socket in which said ball is capable of turning for the purpose of adjusting the mirror universally into various angles or inclinations to suit requirements. The lower half socket 23 is formed on the upper side of a lug 24 which projects forwardly from the lower end of the bracket hanger while the upper half socket is formed on the underside of a clamping plate 25. The lug and clamping plate are adjustably connected with each other for the purpose of securing the ball therebetween in place after the mirror has been shifted into the desired position, this being preferably accomplished by clamping screws 26, 26 connecting the lug and clamping plate on opposite sides of the half sockets thereof, as shown in Figures 1, 2 and 3.

For the purpose of keeping the clamping plate in place relatively to the clamping lug and also to cause the half socket of the clamping plate to be centered and bear most effectively on the respective part of the ball for obtaining the maximum frictional engagement therebetween the rear edge of the clamping plate is provided centrally with a teat 27 which engages with a seat 28 having preferably the form of a perforation arranged on the lower end of the hanger immediately above the clamping lug thereof, as shown in Figures 2, 3 and 4.

The upper end of the hanger or bar of the base is off-set inwardly relatively to the lower end of the same so as to bring the mirror as far forwardly in the car as possible and thus obstruct the space within the car as little as possible and enable the driver to move around with the greatest freedom.

In order however not to interfere with the free opening of the upper sash or section of the windshield that part of the hanger of the bracket base is deflected inwardly, as shown at 29 in Figure 1, whereby a clearance space is provided adjacent to the outer side of the hanger into and out of which the upper part of the adjacent windshield sash can move inwardly and outwardly when opening and closing the same, as shown in Figure 1.

Instead of constructing the base of my improved bracket for attachment to the inner side of a canopy or sedan top or room this bracket may have its base constructed in the form of a downwardly projecting hook 30 which is secured by clamping screws 31 over the top horizontal bar 32 of a windshield frame as shown in Figures 5, 6 and 7. If desired the base may also have the form of a flat upright plate 33 as shown in Figures 8, 9 and 10, which may be secured to the inner side of the top canopy bar by screws or otherwise.

I claim as my invention:

1. A mirror bracket comprising a head adapted to be attached to a mirror and provided on its rear side with a ball, a base having a hanger adapted to be attached to a support and provided with a forwardly projecting lug having a half socket and a perforated seat above said half socket, a clamping plate arranged above said lug and having a half socket which forms a complete socket with the half socket in said lug and also provided on its rear edge with a radial retaining teat which loosely engages with said perforated seat, said complete socket receiving said ball, and clamping screws connecting said lug and clamping plate on opposite sides of said socket for holding said ball frictionally in place therein.

2. A mirror bracket comprising a head adapted to be attached to the rear side of a mirror, a base having a hanger which is adapted to be attached with its upper end to the frame of an automobile canopy and an adjustable connection between the lower end of said hanger and the rear side of said head, said hanger having that part thereof between its upper and lower ends deflected inwardly to provide a clearance space which is adaptd to receive a part of the windshield, and the lower end of said hanger being off-set forwardly relatively to the upper end thereof for bringing the mirror close to the windshield and the upper end of said hanger extending inwardly beyond the center of the pivotal connection between the lower end of the bracket and the mirror supporting head.

In testimony whereof I affix my signature.

WILLIAM LA HODNY.